(12) United States Patent
Veronneau et al.

(10) Patent No.: US 7,727,628 B2
(45) Date of Patent: Jun. 1, 2010

(54) REUSABLE SORBING COALESCING AGENT

(75) Inventors: Linda Veronneau, Mont St-Gregoire (CA); Germain Veronneau, St-Paul D'abbotsford (CA)

(73) Assignee: Torr Canada, Inc., Montreal, Quebec (CA)

( * ) Notice: Subject to any disclaimer, the term of this patent is extended or adjusted under 35 U.S.C. 154(b) by 515 days.

(21) Appl. No.: 10/541,180

(22) PCT Filed: Jan. 15, 2004

(86) PCT No.: PCT/CA2004/000026

§ 371 (c)(1),
(2), (4) Date: Jun. 30, 2005

(87) PCT Pub. No.: WO2005/068069

PCT Pub. Date: Jul. 28, 2005

(65) Prior Publication Data

US 2006/0049108 A1    Mar. 9, 2006

(51) Int. Cl.
*B32B 5/66* (2006.01)
(52) U.S. Cl. .................. 428/402; 428/403; 428/407; 210/263; 210/268; 210/284; 264/293; 264/320; 264/340
(58) Field of Classification Search .......... 428/402, 428/403, 407; 210/263, 268, 284; 264/293, 264/320, 340
See application file for complete search history.

(56) References Cited

U.S. PATENT DOCUMENTS

| 3,797,666 | A | * | 3/1974 | Nakanishi et al. ........... 210/265 |
| 3,913,513 | A | * | 10/1975 | Pedone .................. 114/183 R |
| 4,038,452 | A | | 7/1977 | Kobayashi et al. |
| 4,115,266 | A | * | 9/1978 | Ohshima .................. 210/786 |
| 4,183,984 | A | | 1/1980 | Bowers et al. |
| 4,230,566 | A | | 10/1980 | Faudree, III |
| 4,256,573 | A | | 3/1981 | Shimodaira et al. |
| 4,328,105 | A | | 5/1982 | Arbuckle |
| 4,366,067 | A | | 12/1982 | Golding et al. |
| 4,429,065 | A | | 1/1984 | Gancy |
| 4,563,483 | A | | 1/1986 | Smith et al. |
| 4,581,385 | A | | 4/1986 | Smith et al. |
| 4,941,947 | A | | 7/1990 | Guckert et al. |
| 5,026,736 | A | | 6/1991 | Pontiff |
| 5,135,660 | A | | 8/1992 | Chromecek et al. |
| 5,215,407 | A | | 6/1993 | Brelsford |
| 5,239,040 | A | * | 8/1993 | Kozlowski .................. 528/49 |
| 5,262,048 | A | | 11/1993 | Zimmerman et al. |
| 5,423,991 | A | | 6/1995 | Zimmerman et al. |
| 5,569,331 | A | | 10/1996 | Barber, III |
| 6,173,638 | B1 | | 1/2001 | Denney |
| 6,391,448 | B1 | * | 5/2002 | Geiser .................. 428/402 |
| 6,467,386 | B1 | | 10/2002 | Denney |

FOREIGN PATENT DOCUMENTS

| EP | 1 350 847 | 4/1974 |
| GB | 1350487 | 4/1974 |
| KR | 20-2002-0011036 | 7/2002 |
| WO | WO 94/21347 A1 | 9/1994 |
| WO | WO 94/21862 A1 | 9/1994 |
| WO | WO 02/20115 A3 | 3/2002 |

* cited by examiner

*Primary Examiner*—Leszek Kiliman
(74) *Attorney, Agent, or Firm*—Anthony L. Meola (57) ABSTRACT

A particulate reusable sorbing coalescing agent facilitating the separation of a non-aqueous phase from an aqueous phase. The agent has a desired shape and properties, sheared from a block of matrix material and presents a higher coalescing rate relative to existing sorbing coalescing agents. Also, a method of manufacturing the particulate reusable sorbing coalescing agent and a method of use the particulate reusable sorbing coalescing agent are disclosed.

8 Claims, 9 Drawing Sheets

REUSABLE SORBING COALESCING AGENT

BACKGROUND OF THE INVENTION

1. Field of the Invention

The present invention relates to sorbing coalescing technology.

2. Description of the Prior Art

In the recent past there have been several well documented instances of the inadvertent spillage of non-aqueous liquids causing both environmental, ecological and even toxicological problems for plant species, insects, wild life and even people. Examples of spilled liquids include oils and solvents, and a group of materials known as PCB's, which in addition to being pollutants are carcinogenic. Further, in many cases when the spilled liquid is a nonaqueous liquid which is not compatible with water, such as fuel oil and hydrocarbon solvents, in addition to the spilled liquid, aqueous emulsions are also often formed. For many of these liquids, methods of clean up including adsorption and coalescing steps are known, even for relatively difficult ones such as crude oil and toxic PCB's.

Patents in the prior art in some way involve a particulate material for adsorbing or coalescing a non-aqueous phase, typically crude oil or a derivative of it, such as gasoline, diesel fuel or lubricating oil. These patents utilise a wide range of adsorbents and/or coalescing agents, not all of which are clearly defined. They include: polyethylene; polypropylene; polyisocyanurate; polyurethane; shreds of solids loaded polyurethane foam; silane cross linked polyolefin; polymethyl methacrylate; shredded fibreglass; wool; cork; styrofoam; polyester and/or cotton.

Kozlowski, in U.S. Pat. No. 5,239,040 discloses a particulate reusable polyurethane adsorbents capable of adsorbing many spilled liquids, and from which the adsorbed liquid can be removed by the simple process of centrifugation. The main limitation on the use of the particulate adsorbents of that invention is the properties of the liquid spilled. Any liquid which would destroy or dissolve a polyurethane polymer cannot be recovered using the product described by Kozlowski.

Another difficulty with spilt non-aqueous liquids arises when water is present. A water immiscible liquid can be present in association with water in two quite different forms. At least a part of it will generally be present as a discrete second phase, which may be heavier or lighter than water. The remainder will generally be present as an emulsion, of at least some level of stability, and in which water can be either the continuous phase or the disperse phase. In both cases, there is also the difficulty that nearly all substances that appear to be immiscible with water, for example light hydrocarbons such as benzene, in fact are soluble in water to a small extent, often at a level of parts per million.

Until quite recently it was considered that the chemical structure of the material used in the adsorbent or coalescing agent powder (units) determined the adsorptive or coalescing characteristics of the adsorbent or coalescing agent. There are numerous patents in which polyurethane foam is stated to be essential. According to Kozlowski, in WO 02/20115, not only Kozlowski polyurethane foam as described in U.S. Pat. No. 5,239,040, but also other matrix materials, when fabricated into a body of high surface area material such as foam, if used under the correct conditions, will function as an emulsion breaker, and will separate a flow of an aqueous emulsion into two separate phases.

Patents of the prior art use polyethylene, and describe comminuting a matrix material, typically a body of polymer foam, into small particles.

SUMMARY OF THE INVENTION

The present invention shows that it appears to be the actual physical size and shape of the coalescing agent that determines the coalescing capabilities of the sorbing coalescing agent. Provided that the material used in the sorbing coalescing agent is stable in the presence of both phases being separated, the agent's chemical structure is not the only determining characteristic.

The present invention provides a reusable sorbing coalescing agent facilitating the separation of a non-aqueous phase from an aqueous phase consisting of a ragged-edge particulate reusable material having substantially small uniform sized particulate units, wherein the particulate reusable material includes particulate units of a size ranging from 1 μm to 3 cm, preferably of a size ranging from 10 μm to 2000 μm, wherein said particulate units have a dimension in the nanoscale range. and wherein the ranged edges of said particulate units include filaments extending outwardly therefrom. In accordance with the present invention the particulate reusable material may include particulate units of a size from 10 μm to 1000 μm. The particulate material as mentioned includes at least one of its dimensions in the nanoscale range ($10^{-9}$m); for example, thickness of the particulate and/or size of the filament and/or thickness of the ragged edge.

The comminuted agent used in the present invention is fabricated to have ragged edges. These ragged edges determine the coalescing capability, and the realisation that almost any polymer which is not affected by the liquid to be coalesced, can be used as the matrix material.

The present invention also seeks to provide a method of manufacturing a sorbing coalescing agent consisting of a ragged-edge particulate reusable material having substantially uniform sized particulate units, including the steps of: a. feeding a cellular matrix material having a predetermined density to a shearing device containing a shearing rotating blunt surface and b. shearing the cellular matrix material in the shearing device, into uniform sized particulates of predetermined size using the shearing rotating blunt surface, the particulates having ragged edges. The predetermined density and the predetermined size are chosen such that coalescing is increased.

DETAILED DESCRIPTION OF THE INVENTION

This invention seeks to provide a particulate reusable sorbing coalescing agent to facilitate the separation of a non-aqueous phase from an aqueous phase with a desired shape and properties, sheared from a block of cellular matrix material, particularly a foam, the sorbing coalescing agent presenting a higher coalescing rate relative to any other sorbing coalescing agent of the prior art.

The reusable sorbing coalescing agent of the present invention is a polarizable organophilic hydrophobic sorbing coalescing agent compatible with petroleum-based products. The sorbing coalescing agent is non-toxic, odourless, chemically inert and resistant to most chemicals, including diesel fuels.

The term reusable for the purpose of this application refers first to a self-cleaning material, exempting the need for any kind of interruption to perform a cleaning step, enabling a continuous usage until its recommended disposal, and second to material which suffers no significant degradation with successive use exempting the need for a replacement each time it is used.

The term polarizable polymer for the purpose of this application refers to a polymer capable of being electrostatically charged. This capability is part of Van der Waals forces, which is of common knowledge in the electrical field.

The term absorption for the purpose of this application refers to any process that causes one substance to penetrate the inside of another substance. In the case of a spill clean-up, the aqueous phase and the non-aqueous phase are drawn into porous sorbent materials or into particulate material spaces.

The term adsorption for the purpose of this application refers to a process that causes one substance to be attracted to and stick to the surface of another substance, without actually penetrating its surface.

The shape of the sheared particulate sorbing coalescing agent is a ragged-edge material having substantially uniform sized particulate units of polymers of size ranging from 1 μm to 3 cm, preferably ranging from 10 μm to 2000 μm. The particle itself, being of irregular shape, must have at least one of its dimensions in the nanoscale range of ($10^{-9}$m); such measurement applies to the particle itself and/or the size of one of its filaments and/or the thickness of one of the ragged edges of the sheared particles.

Figure 1:
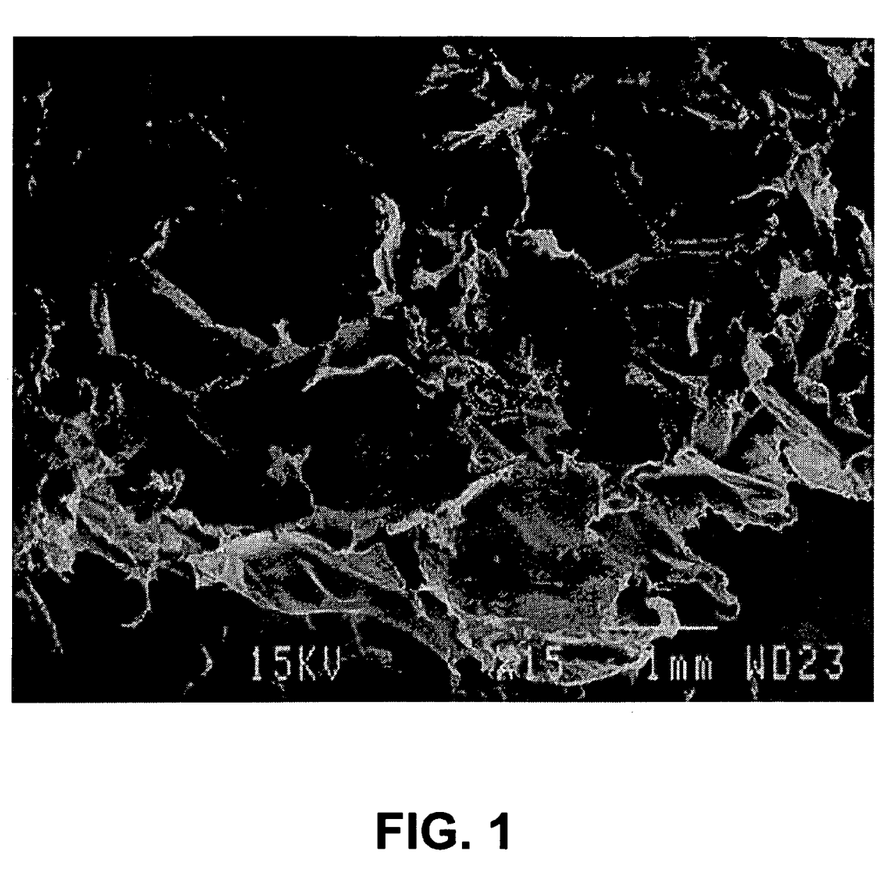
FIG. 1 shows a photomicrograph of the sorbing coalescing agent.

FIG. 1 is a photomicrograph of the sorbing coalescing agent with a magnification of 15 times, showing in detail the dimensions and ragged edges structure.

The particle structure of the sorbing coalescing agent that resides in the described nanoscale dimension allows different forces like electrostatic and Van der Waal to be engaged. By maximizing the surface density of the sorbing coalescing agent, the ragged edges of the particulate along with their extended filaments allows such forces to be active and determine the coalescing/adsorbing properties.

The specific size and shape of the particulate, having a maximized surface density, enables the sorbing coalescing agent to adsorb and coalesce spilled liquid "by itself", faster, and in larger amounts. By extension it shows that geometry is an important aspect of adsorption and coalescing effect and is not strongly affected by surface chemistry.

The microstructure of the sorbing coalescing agent allows it to outdraw the superficial tension force of the spilled liquid and act as an emulsion breaker. Forces involved however, are lesser than the superficial tension force of water thus allowing the separation phase to occur and the coalescing phenomenon to take place. A large number of particulates of the sorbing coalescing agent having the maximized surface density are provided together thus forming a mass of the sorbing coalescing agent with a very high superficial area within the mass.

The present invention also seeks to provide a method of using the sorbing coalescing agent for coalescing and separation of a non-aqueous phase from an aqueous phase. In the method, when contacting the sorbing coalescing agent with a flow of spilled liquids emulsion including an aqueous phase and a non-aqueous phase not compatible with water, both phases of the spill are absorbed into the mass of the sorbing coalescing agent, the agent will then break the emulsion and droplets of the non-aqueous phase will be adsorbed on the surface of the ragged edges of each of the particulate units of the sorbing coalescing agent. With the number of droplets rising on the surface of the particulate agent, one or more droplets will combine to form single droplets of larger sizes, which are sufficiently large to coalesce into a separate phase. The large size coalesced droplets will then be desorbed by the agent forming a separate phase. It is then possible to separate the aqueous and non-aqueous phases and to recover each of the two phases separately if desired. The non-aqueous phase being absorbed, adsorbed, coalesced and desorbed without an interruption for a cleaning step (i.e., self-cleaning) together with a non-significant degradation with its successive use enables the sorbing coalescing agent to be continuously used (i.e., reusable), until its efficiency decreases and a disposal is recommended.

The coalescing action of the agent in a flow rate ranging from 30 cubic meters per hour per square meter to 90 cubic meter per hour per square meter across a bed area of particulate material of 1 square meter results in a reduction of oil-in-water content ranging from 92.5% to 69.1% respectively. Reduction of oil-in-water content in flow rates outside this range is possible. However, fast flows create a low reduction rate, while too slow a flow will have high, but not optimum, reduction rate. The optimal flow rate for a more stable reduction is between 40 $m^3/h/m^2$ and 60 $m^3/h/m^2$. Within the optimum flow rate, the particulate sorbing coalescing agent's reduction rate ranges from about 87.5% to about 88.2%. (See Example 1).

In the production of the sorbing coalescing agent, the comminuting process is controlled to provide particles of a desirable order of size and with ragged edges. In making the reusable sorbing coalescing agent, the manner in which a matrix material is sheared to provide the final units with the desired dimensions is carefully controlled.

Figure 7:
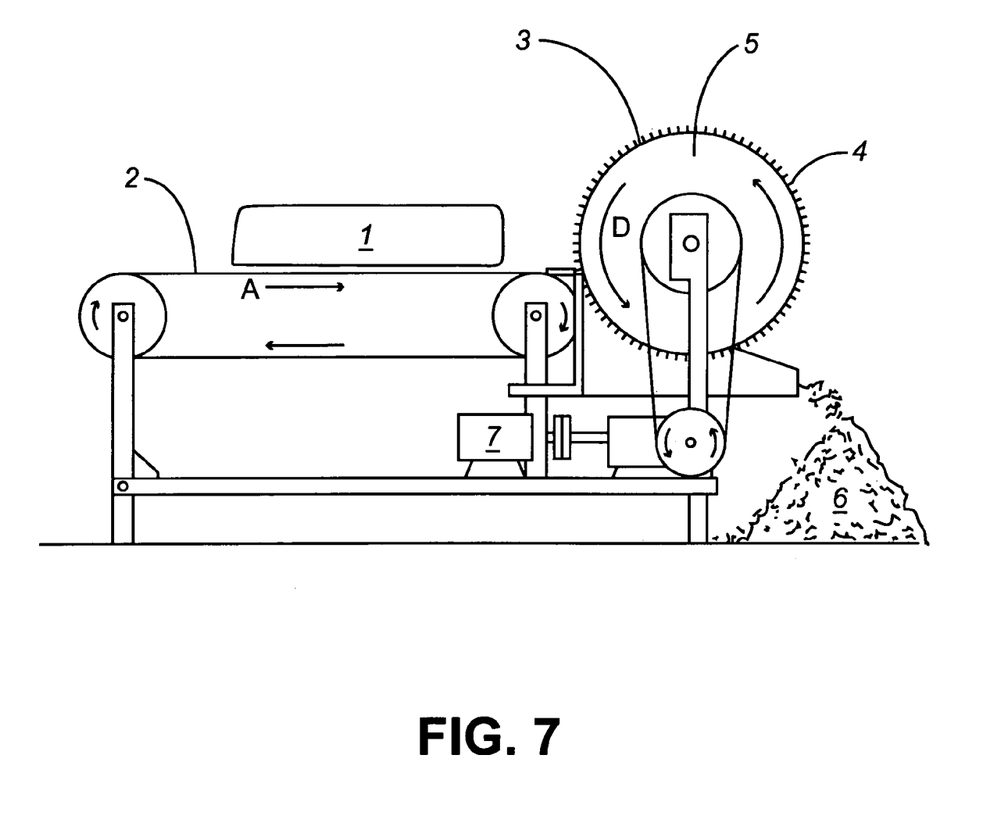
FIG. 7 shows a schematic view of the method of manufacturing the particulate reusable sorbing coalescing agent.

The present invention also seeks to provide a method of manufacturing the particulate reusable sorbing coalescing agent as seen in FIG. 7. In the first step of the preferred embodiment of the method of the present invention, a solid and lightweight foam of density of less than 130 $kg/m^3$, preferably in a bun shape (1), of dimensions substantially approximately to 30 cm high×60 cm wide×180 cm long are lengthwise and on-the-flat fed, horizontally transported on a conveyor (2) at a feed rate ranging from 0.7 cm per second to 3.0 cm per second, preferably 1.5 cm per second in the direction (A) to a shearing device (3). The shearing device comprises a blunt shearing surface (4), preferably a sandpaper, attached to a fixed drum (5) of dimensions of 60 cm diameter× 60 cm long and rotating at a speed within the range of from about 500 RPM to about 1500 RPM, preferably at about 1000 RPM in the direction (D). The sandpaper has a shearing surface roughness range equivalent to that of 8-grit to 54-grit sandpaper, preferably of 20-grit sandpaper.

Figure 2:
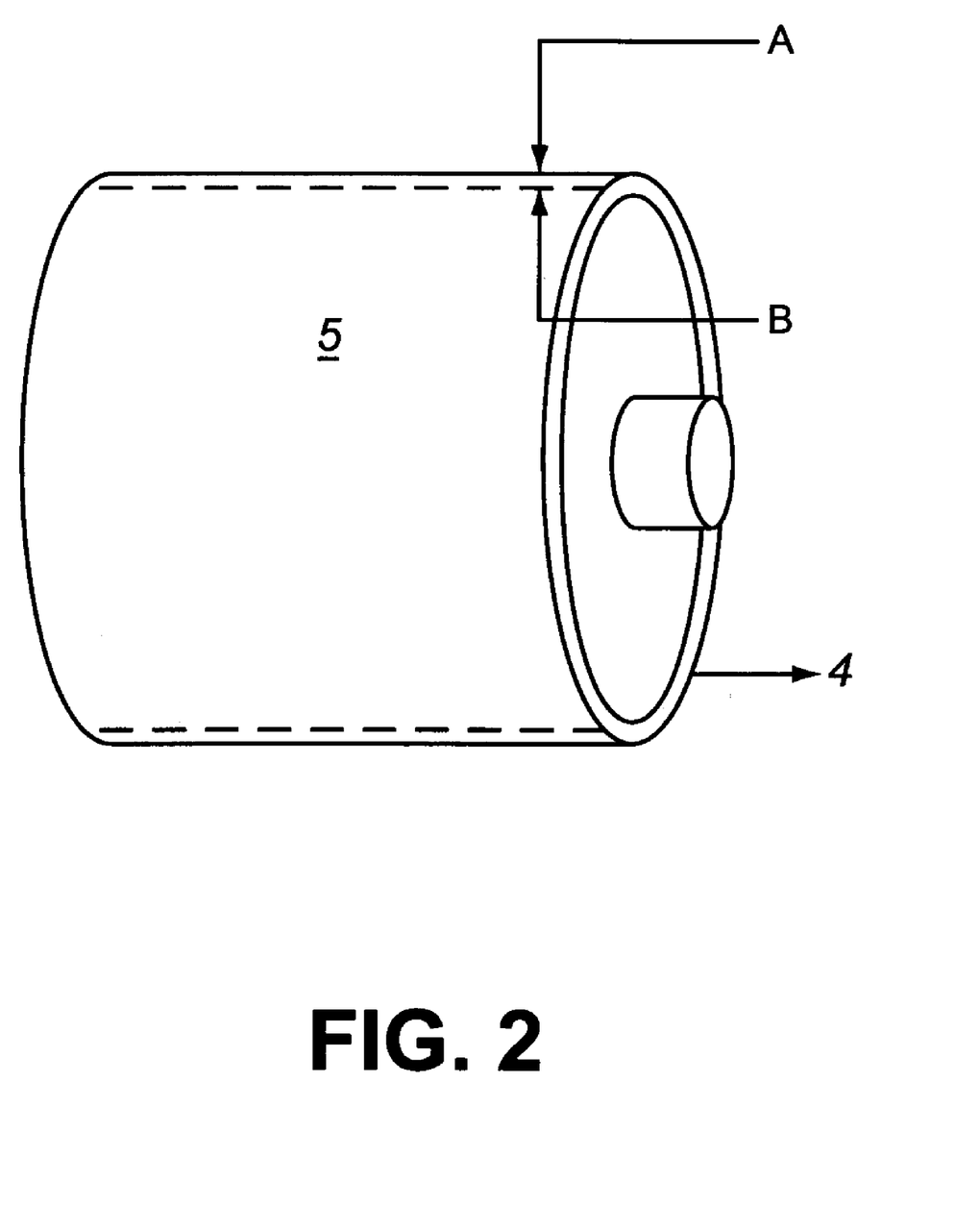
FIG. 2 shows a schematic view of the "blunt" shearing rotating surface.
Figure 3:
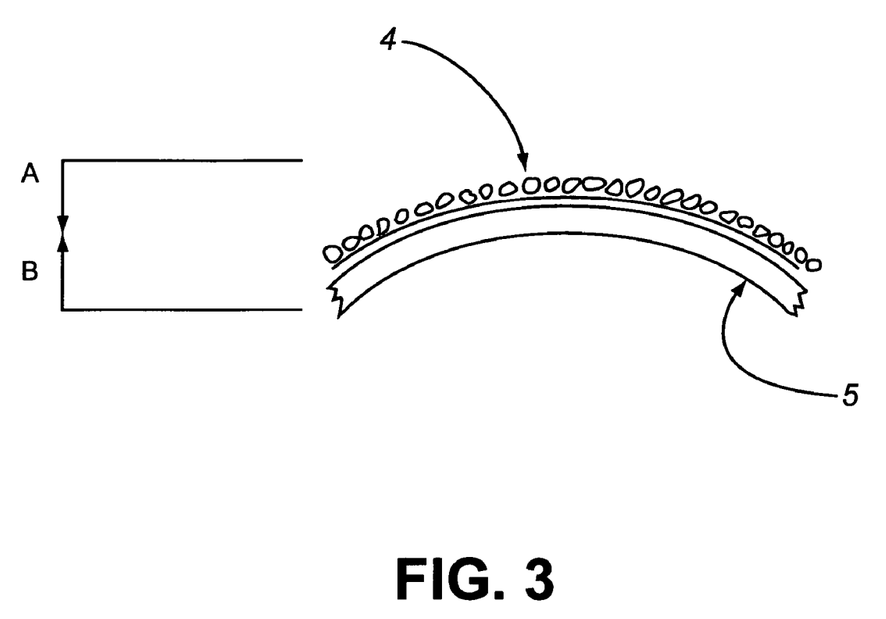
FIG. 3 is a schematic view of the section A-B of the "blunt" shearing rotating surface.
Figure 5:
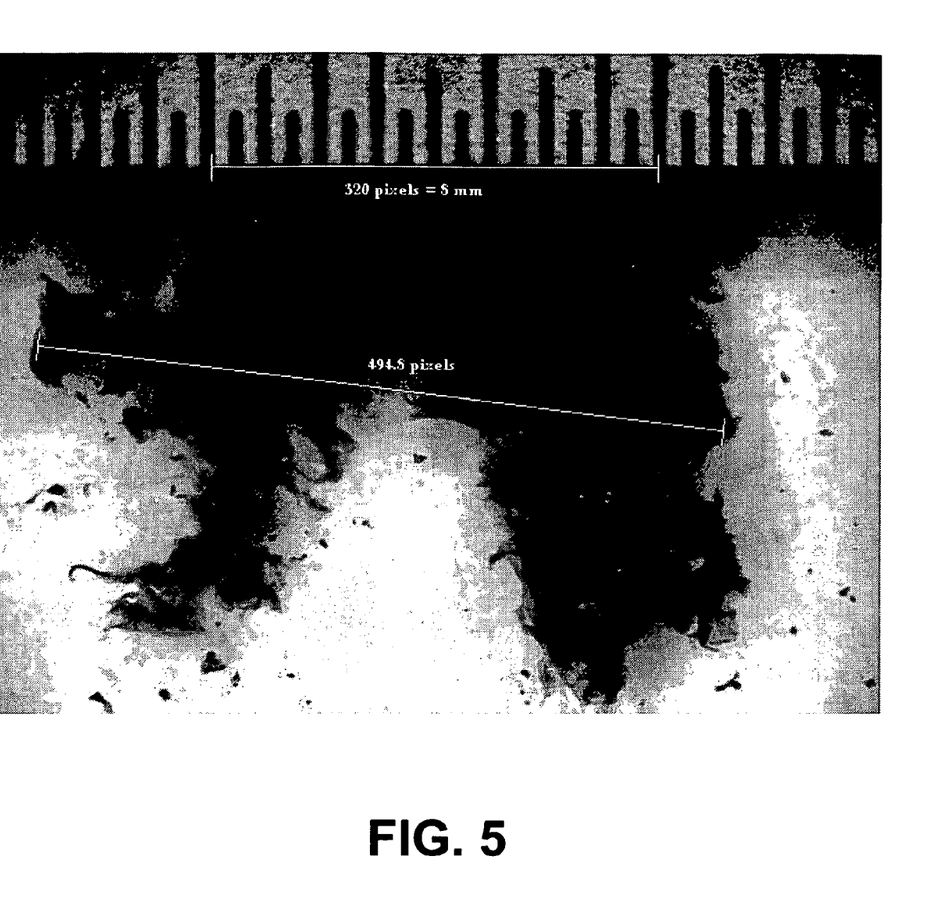
FIG. 5 shows a picture showing the dimensions of the final sorbing coalescing agent units.

In FIGS. 2 and 3, the details of the shearing surface sandpaper (4) are shown attached to the external surface area of the fixed drum (5). The matrix material buns when fed into the shearing device have an approximately 90 degree angle contact with the drum's shearing surface area. The matrix material in contact with the drum is then sheared by the shearing surface into small uniform sized ragged-edge particulate units of reusable sorbing coalescing agents (6) having the desired shape and size as shown in FIG. 5. A motor and gear reducer (7) moves both the drum and the conveyor as seen in FIG. 7.

Figure 6:
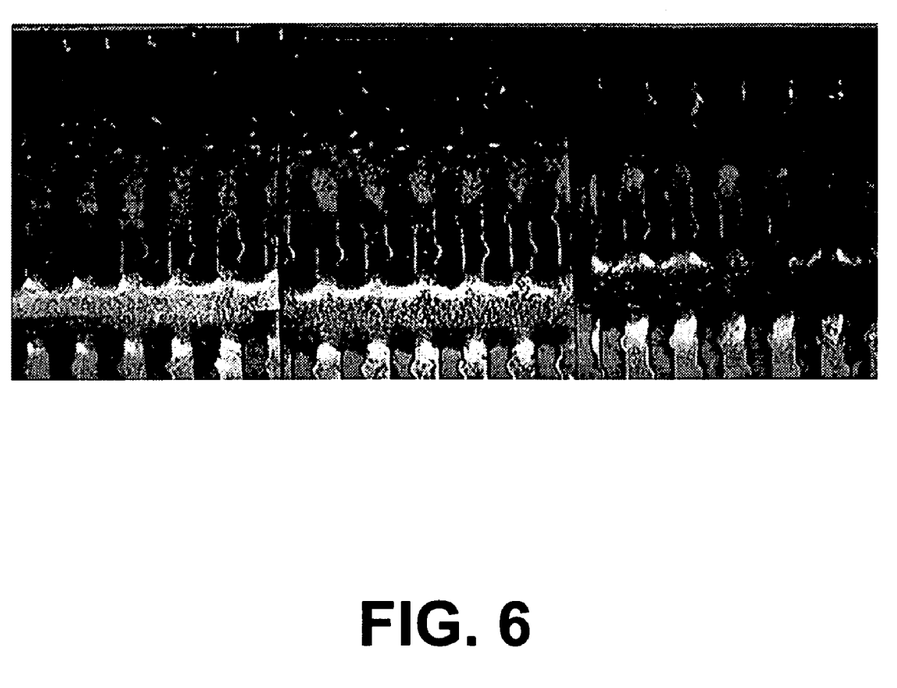
FIG. 6 shows a picture of the "blunt" shearing rotating cutters.

Alternatively the shearing device comprises blunt cutters attached to a fixed drum of the same dimensions above, preferably as designed in FIG. 6. The drum rotates at a speed within the range of from 200 RPM to 4000 RPM. When shearing large quantities of materials it is recommended the speed of the drum to be preferably at about 4000 RPM.

Figure 4:
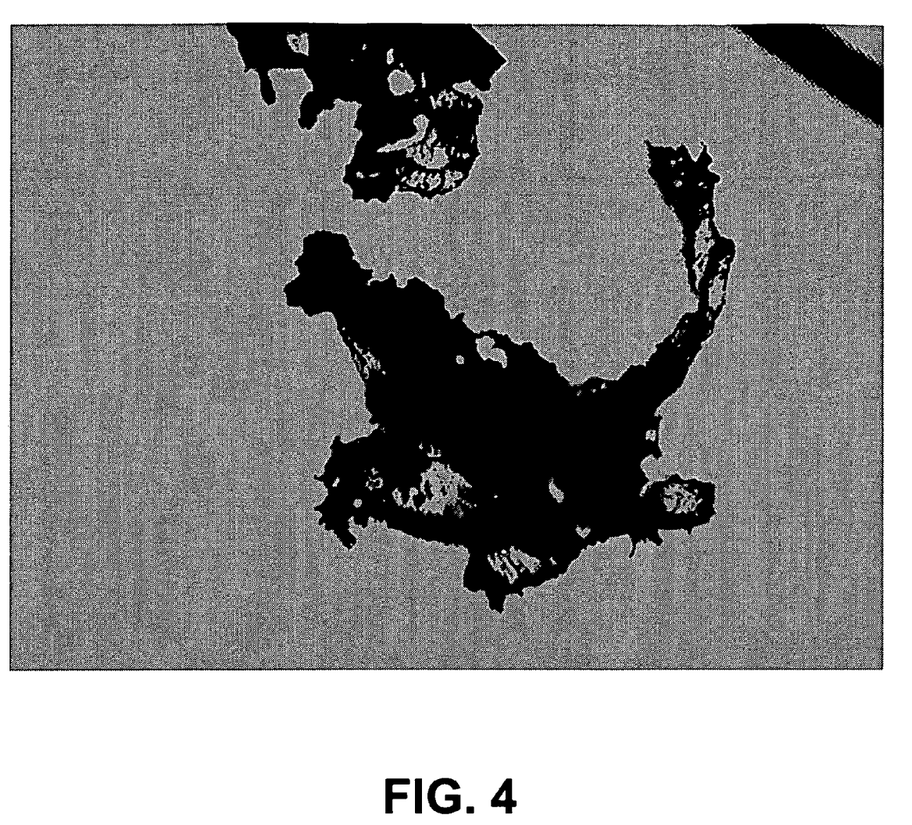
FIG. 4 shows a picture of the sorbing coalescing agent final unit.

The shearing step using the blunt shearing rotating surface at the specified RPM and feed rates, provides the small particles of sorbing coalescing agent having the pre-chosen dimensions range above and very specifically ragged, or torn, edges. FIG. 4 shows that these edges include filaments extending outwardly from the edge of the particles and a picture of the ragged, or torn, edges of the sorbing coalescing agent final unit can be seen.

The reusable sorbing coalescing agent of the present invention is fabricated from an organic, lightweight, odorless, non-toxic, pH neutral foam and preferably floats on water even when saturated. The reusable sorbing coalescing agent of the present invention is a self-cleaning particulate that does not leach, can be re-used 100+times and requires no immediate disposal.

The particulate sorbing coalescing agent product may be used in several formats such as: particulate (granular particles), encased in the form of pillows, socks or mattresses.

The only chemical limitation on the matrix material to be used is the requirement that it is polarizable and is not affected at all by both the non-aqueous phase, which it is wanted to coalesce, and the aqueous phase. It then follows that polyethylene, polypropylene, styrene, a copolymer of polyethylene and polypropylene, a copolymer of styrene and polyethylene, and a copolymer of styrene and polypropylene and quite possibly other polymers from longer chain alkenes, are the best choice as the polymer. This is because, first polyethylene is not affected by many non-aqueous materials, second it can be turned into a matrix material having the required characteristics, third it can be sheared, and fourth it is freely available.

EXAMPLE 1

Performances of the Sorbing Coalescing Agent GYFSORB # EXP-0275 in Oil Filtration Unit 1. OBJECTIVES: Evaluate the efficiency of GYFSORB # EXP-0275 to remove oil emulsions from water when used in the Filtration System.

2. PROCEDURE: Four (4) laboratory scale tests were run to measure the performances of Gyfsorb in experimental filtration unit feed at different flow rates of oily water. For each test 400 g of EXP-0275 media were used and run in continuous for height hours. Samples of the inlet and outlet of filter were taken at a regular basis and their Total Oil & Grease content were determined by solvent extraction followed by Infrared Spectrometry analysis as per EPA 4181. Standard Method. The test parameters are presented in table 1.

TABLE 1

| | Test parameters | | | |
|---|---|---|---|---|
| Test N° | Flow rate | Exp-0275 | Duration | Sampling |
| 1 | 30 m$^3$/h/m$^2$ (4.0 LPM) | 400 g | 8 hours | Every hour (7) |
| 2 | 40 m$^3$/h/m$^2$ (5.5 LPM) | 400 g | 8 hours | Every hour (7) |
| 3 | 60 m$^3$/h/m$^2$ (8.1 LPM) | 400 g | 8 hours | Every hour (7) |
| 4 | 90 m$^3$/h/m$^2$ (12.2 LPM) | 400 g | 8 hours | Every hour (7) |

Figure 8:
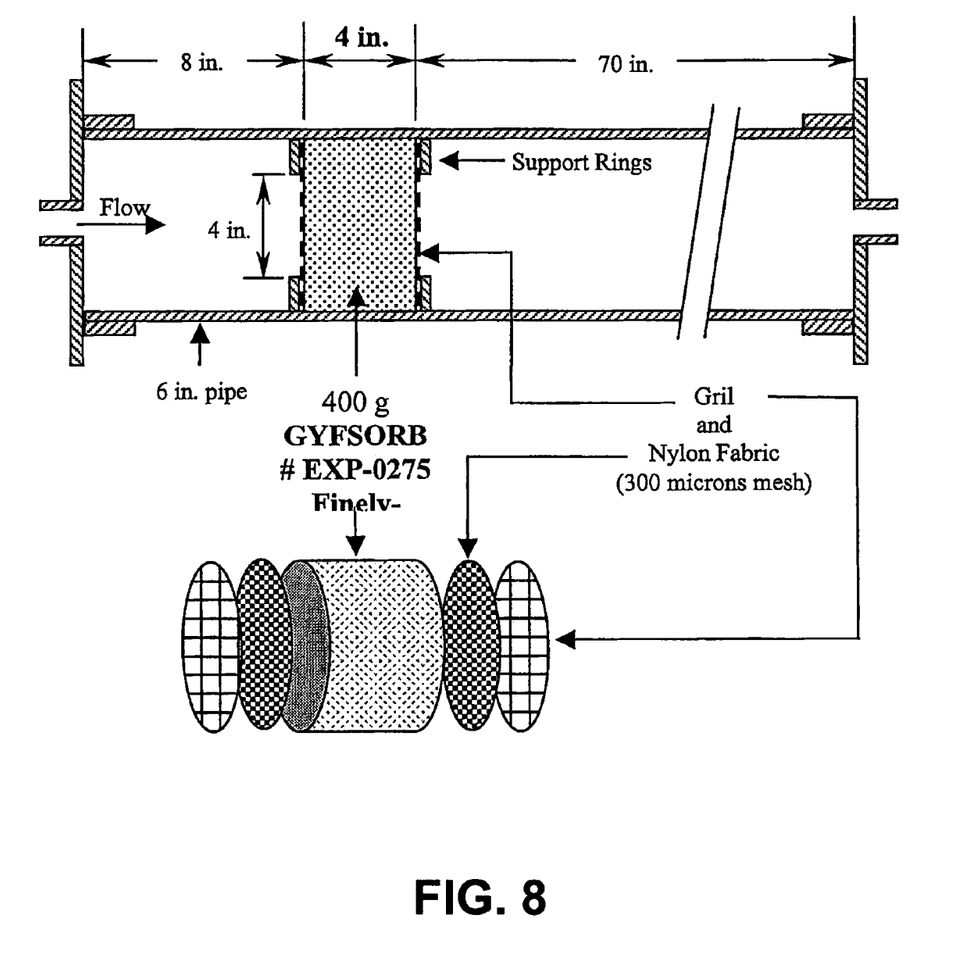
FIG. 8 shows a schema of experimental filtration unit.

2.1 Experimental Filtration Unit: The Experimental Filtration Table-Top Unit used in this series of tests is shown in FIG. 8.

Figure 9:
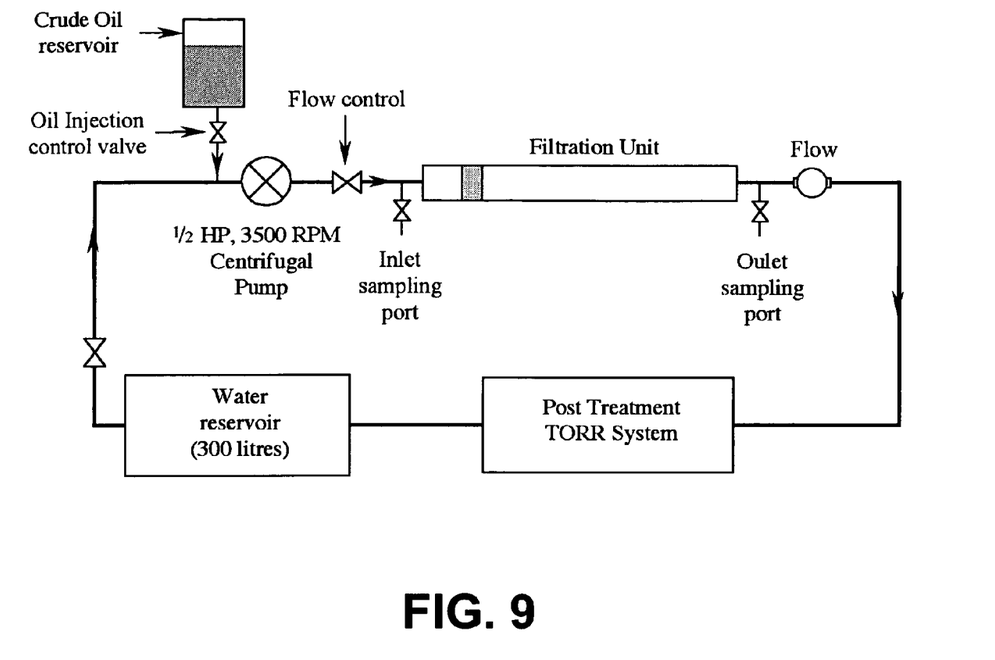
FIG. 9 shows a schema of experimental setup.

2.2 Experimental Set-Up: The Experimental Set-Up used in this series of tests is shown in FIG. 9.

2.3 Oily-Water: Oily-water was produced by injecting Light Crude Oil (Brent, 45° API) at the inlet of ½ HP (375 VA), 3500 RPM centrifugal jet pump along with fresh and clean water. The oil emulsion droplet size distribution at the inlet of filtration unit, was determined by membrane filtration and by differential settle time according to Stoke's law equation. The typical distribution is given in table 2.

TABLE 2

| Typical distribution of oil emulsions | |
|---|---|
| Emulsion Size (micron) | Quantity % |
| 1-5 | 10-15 |
| 5-20 | 10-15 |
| 20-50 | 20-35 |
| 50+ | 50-35 |

3-Results

The results obtained are given in table 3. For each of the four tests, the average concentration of oil at the entry was of 325-360 ppm. The mean concentration at the exit varied from 17 ppm to 110 ppm, in function of the flow augmentation, that is to say a percentage of reduction passing from 92% to 70%. The ability to absorb oil of EXP 0275 is higher than these obtained with other materials of filtration tested in our laboratory.

The decrease of the percentage of reduction of Total Oil & Grease concentrations at the outlets in function of the augmentation of the flow rates can be attributed to the reduced time of residence of the oily-water in the filtration bed. On this concern, the EXP-0275 comport itself like every other materials of filtration tested in our laboratory and available on the market.

It is, on the other hand, interesting to note that, with intermediate flow rates (i.e. 40 m$^3$/h/m$^2$ and 60 m$^3$/h/m$^2$), the percentage of efficiency to remove the Total Oil & Grease seams stable; these results suggest the existence of an optimal flow rate which would be between 40 m$^3$/h/m$^2$ and 60 m$^3$/h/m$^2$.

TABLE 3

Reduction of Total Oil & Grease concentrations in function of the flow rate

| | Test No 1 | | | Test No 2 | | | Test No 3 | | | Test No 4 | | |
|---|---|---|---|---|---|---|---|---|---|---|---|---|
| | \multicolumn{12}{c}{F.R.*} |
| | 30 m³/h/m² (4.0 LPM) | | | 40 m³/h/m² (5.5 LPM) | | | 60 m³/h/m² (8.1 LPM) | | | 90 m³/h/m² (12.2 LPM) | | |
| Sample No | In (ppm) | Out (ppm) | % of reduction | In (ppm) | Out (ppm) | % of reduction | In (ppm) | Out (ppm) | % of reduction | In (ppm) | Out (ppm) | % of reduction |
| 1 | 157 | 12.7 | 91.9 | 390 | 9.4 | 97.6 | 456 | 35.2 | 92.3 | 190.8 | 50.1 | 73.7 |
| 2 | 37 | 7.6 | 79.5 | 402 | 15.8 | 96.1 | 177.6 | 33.6 | 81.1 | 314.7 | 83.7 | 73.4 |
| 3 | 600 | 18.0 | 97.0 | 483 | 12.0 | 97.5 | 360 | 39.7 | 89.0 | 338.7 | 106.9 | 68.4 |
| 4 | 143 | 12.6 | 91.2 | 513 | 20.0 | 96.1 | 336 | 37.0 | 89.0 | 491.7 | 154.9 | 68.5 |
| 5 | 600 | 27.3 | 95.5 | 450 | 16.0 | 96.4 | 366 | 42.5 | 88.4 | 422.7 | 151.9 | 64.1 |
| 6 | 600 | 25.0 | 95.8 | 41 | 5.6 | 86.3 | 386.7 | 47.1 | 87.8 | 272.7 | 94.9 | 65.2 |
| 7 | 414 | 14.8 | 96.4 | 12.5 | 7.2 | 42.4 | 440.7 | 43.4 | 90.2 | 453.6 | 134.2 | 70.4 |
| Mean | 364.4 | 16.9 | 92.5 | 327.4 | 12.3 | 87.5 | 360.4 | 39.8 | 88.2 | 355.0 | 110.9 | 69.1 |

*Flow rate.

4-Conclusion

This series of tests confirms that EXP 0275 is an excellent material of filtration for the treatment of oily water and may be utilized in filtration systems. We conclude that EXP 0275 can be used as a particulate reusable sorbing coalescing agent facilitating the separation of a non-aqueous phase from an aqueous phase, presenting a higher coalescing rate relative to any other sorbing coalescing agent of the prior art.

It should be understood that the preferred embodiments mentioned here are merely illustrative of the present invention. Numerous variations in design and use of the present invention may be contemplated in view of the following claims without straying from the intended scope and field of the invention herein disclosed.

The invention claimed is:

1. A reusable sorbing coalescing agent for facilitating the separation of a non-aqueous phase from an aqueous phase consisting of a ragged-edge particulate reusable material having substantially small uniform sized particulate units, wherein the particulate reusable material includes particulate units of a size ranging from 1 μm to 3 cm and which comprise a ragged edge component having a dimension in the nanoscale range, and wherein said ragged edge component comprises outwardly extending filaments.

2. The sorbing coalescing agent according to claim 1, wherein the particulate reusable material includes particulate units of a size ranging from 10 μm to 2000 μm.

3. A reusable sorbing coalescing agent for facilitating the separation of a non-aqueous phase from an aqueous phase consisting of a ragged-edge particulate reusable material having substantially small uniform sized particulate units, wherein the particulate reusable material includes particulate units of a size ranging from 1 μm to 3 cm and which comprise a ragged edge component having a dimension in the nanoscale range, wherein said ragged edge component comprises outwardly extending filaments and wherein the dimension in the nanoscale range is selected from the group consisting of ragged edge component thickness, ragged edge component filament size, and combinations thereof.

4. The sorbing coalescing agent according to claim 2, wherein the dimension in the nanoscale range is selected from the group consisting of ragged edge component thickness ragged edge component filament size, and combinations thereof.

5. The sorbing coalescing agent according to claim 2, wherein the particulate reusable material includes particulate units of a size ranging from 10 μm to 1000 μm.

6. The sorbing coalescing agent according to claim 4, wherein the particulate reusable material includes particulate units of a size ranging from 10 μm to 1000 μm.

7. The sorbing coalescing agent according to claim 6 wherein the particulate reusable material is an organophilic hydrophobic sorbing coalescing agent capable of being electrostatically charged.

8. The sorbing coalescing agent according to claim 3, wherein the particulate reusable material includes particulate units of a size ranging from 10 μm to 2000 μm.

* * * * *